United States Patent [19]

Hoadley

[11] 4,140,377
[45] Feb. 20, 1979

[54] DENTAL X-RAY FILM VIEWER

[76] Inventor: Howard W. Hoadley, 9143 Petit Ave., Sepulveda, Calif. 91343

[21] Appl. No.: 819,980

[22] Filed: Jul. 28, 1977

[51] Int. Cl.$^2$ .................. G03B 21/10; G03B 21/28
[52] U.S. Cl. ................................ 353/78; 353/27 R; 353/55
[58] Field of Search ............... 353/26, 27, 78, 63, 353/99, 55, 45, 77

[56] References Cited

U.S. PATENT DOCUMENTS

| | | | |
|---|---|---|---|
| 2,473,736 | 6/1949 | Stern | 353/26 R |
| 2,576,586 | 11/1951 | Frankel | 353/78 |
| 2,852,980 | 9/1958 | Schroder | 353/55 |
| 3,440,956 | 4/1969 | Miller | 353/45 |
| 3,489,494 | 1/1970 | Snider | 353/27 R |
| 3,733,121 | 5/1973 | Smitzer | 353/27 R |
| 3,834,800 | 9/1975 | Brownscombe | 353/27 R |
| 4,030,821 | 6/1977 | Badalich | 353/78 |

*Primary Examiner*—Richard E. Aegerter
*Assistant Examiner*—John W. Shepperd
*Attorney, Agent, or Firm*—John T. Matlago

[57] ABSTRACT

A viewer is provided which is especially adapted for viewing dental X-ray films taken of the mouth of a patient. The viewer is provided with a throat extending inwardly from the front thereof which vertically divides the housing into upper and lower sections. A display screen is provided on the front of the upper section of the housing with a light compartment for a light source on the side thereof. The light source includes a dichroic filter for filtering out the infrared rays of the high intensity light provided and a condensing lens for projecting the visible rays down through a film located in the throat to provide an image bearing beam. In the lower section of the housing, a mirror located below the film horizontally reflects the image bearing beam through a projection lens onto a second mirror which directs the image bearing beam rearwardly and upwardly onto a rear mirror located on the upper section of the housing opposite the screen. The projection lens provides for focussing the image bearing beam such that upon reflecting from the rear mirror it provides an enlarged image of the film on the screen.

9 Claims, 11 Drawing Figures

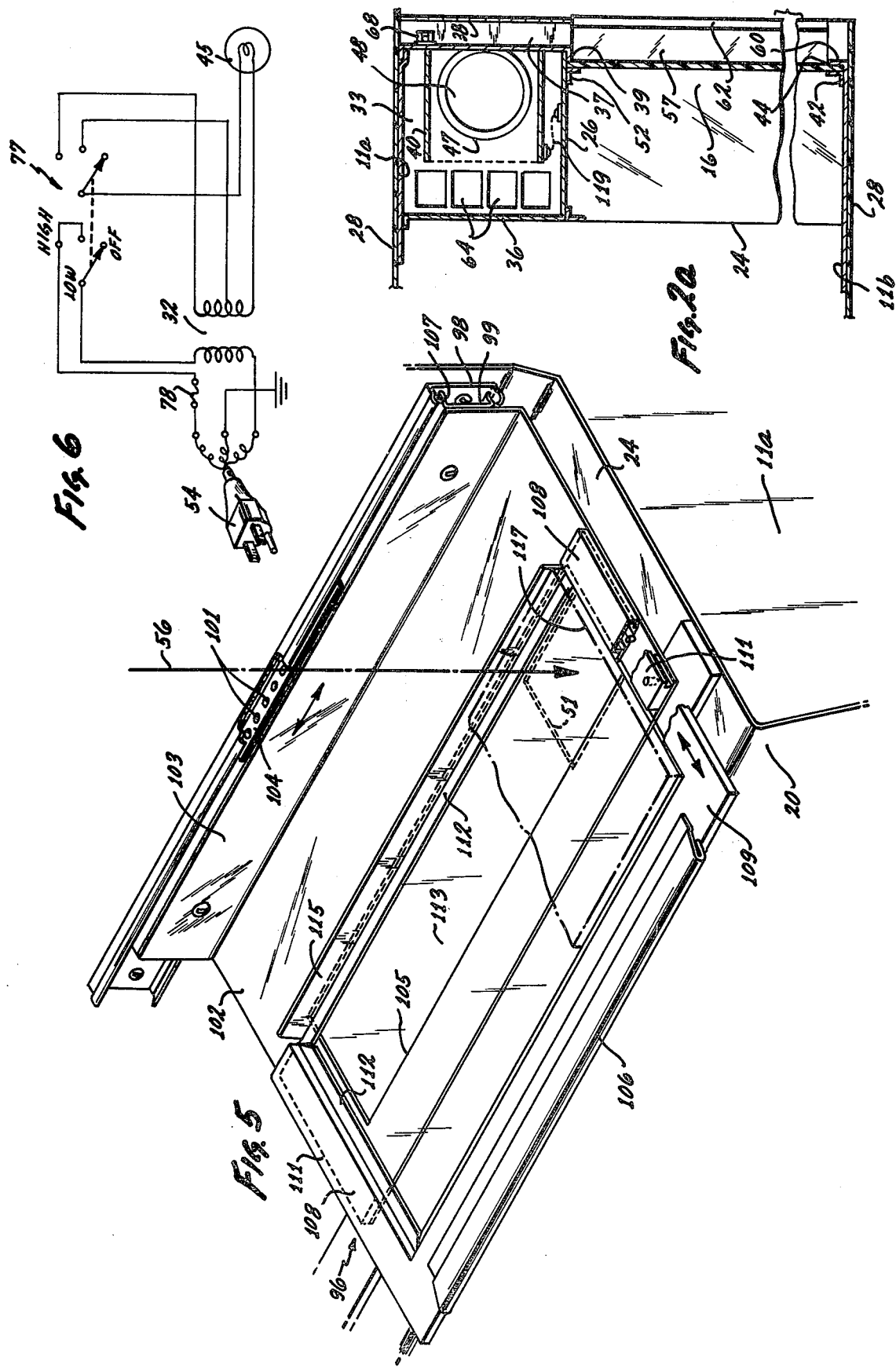

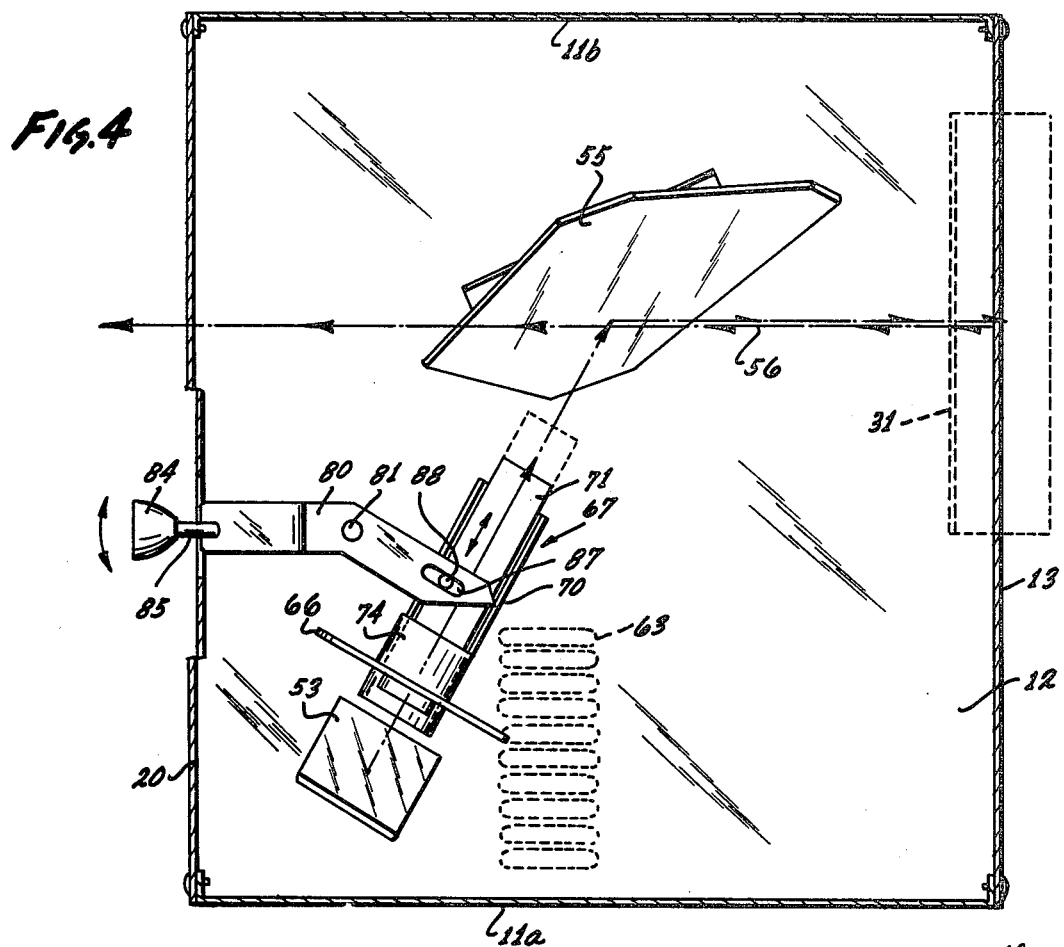
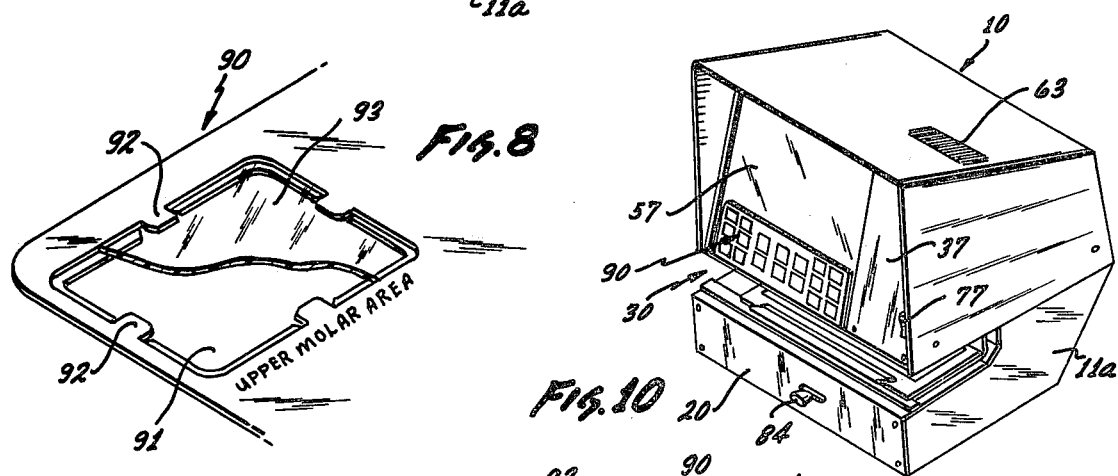
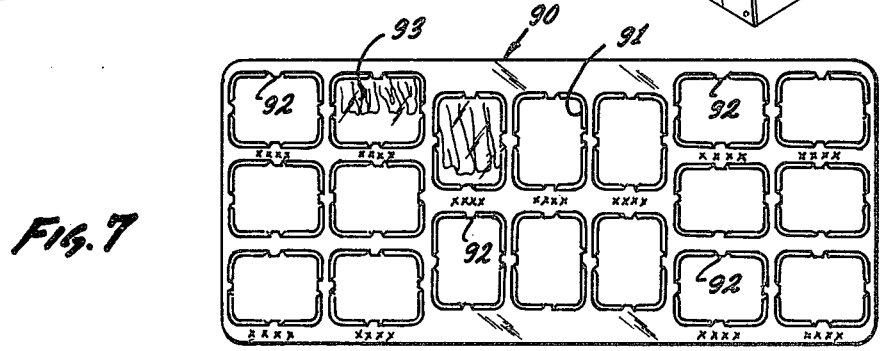

DENTAL X-RAY FILM VIEWER

BACKGROUND OF THE INVENTION

This invention relates to film viewers and more particularly to apparatus for viewing dental X-ray films.

As an aid for a dentist, it is commonly the practice to provide a flat plastic holder having openings therein in which a set of X-ray films taken of teeth in different portions of the mouth of a patient are mounted. The dentist by holding the holder up against a source of light obtains an overall general view of the X-ray films mounted thereon and directs his attention to a particular one of the films which shows the tooth he is interested in. Inasmuch as the size of the picture of the tooth on the X-ray film as viewed in this manner is quite small, there is a need for a dental film viewer that can be conveniently used to project an enlarged image of a selected one of the films on the holder so as to make it easier to interpret the film for accurate diagnosis.

SUMMARY OF THE INVENTION

In accordance with one embodiment of the invention, a housing is provided with a throat extending inwardly from the front thereof which effectively divides the housing into an upper section and a lower section. A display screen is located on the front of the upper section of the housing with a light compartment on the side thereof. In the light compartment, a light source directs a high intensity light through a filter which passes the infrared rays and directs the visible rays down through a condensing lens located on the bottom of the light compartment. A selected one of a set of X-ray films mounted on a holder is positioned by an X-Y carrier supported in the throat of the housing in the path of the light projected by the condensing lens. A first mirror located in the lower section of the housing below the film reflects the image bearing beam horizontally through a projection lens toward a second mirror which is located in the lower section inwardly from a rear mirror disposed in the upper section opposite the screen. The projection lens provides for focussing the image bearing beam such that upon being reflected from the second mirror onto the rear mirror and then forwardly onto the rear of the display screen a substantially enlarged image of the film can be viewed from the front of the screen.

Accordingly, one of the objects of the present invention is to provide a viewer especially adapted for enlarged viewing by a dentist of a patients's X-ray films mounted on a holder.

Another object of the present invention is to provide a film viewer wherein the high intensity lamp used for projecting an image of an X-ray film is placed in a light compartment located above the X-Y carrier provided for the X-ray film holder to obviate the need for a fan to cool the film.

Still another object of the present invention is to provide a simple optical projection system arrangement for a viewer which provides for enlarged images of X-ray films mounted on a holder to be moved about on the screen in directions which directly relate to the directions in which an X-Y carrier provided for the holder is being moved.

With these and other objects in view, the invention consists of the construction, arrangement and combination of the various parts of the device, whereby the objects contemplated are obtained as hereinafter set forth, pointed out in the appended claims and illustrated in the accompanying drawings.

BRIEF DESCRIPTION OF THE DRAWINGS

FIG 2a is a sectional plan view as taken along lines 2a—2a in FIG. 2;

FIG. 4 is a sectional plan view of the viewer as taken in the direction of arrows 4—4 in FIG. 3;

FIG. 5 is an enlarged perspective view of the X-Y carrier for the viewer;

FIG. 6 is a schematic electrical diagram showing the three position switch for connecting power to the lamp;

FIG. 7 is a plan view of the holder on which the dental X-ray films taken of the mouth of a patient are mounted;

FIG. 8 is a perspective view illustrating a dental X-ray film inserted in one of the openings of the holder in FIG. 7;

FIG. 10 illustrates a holder for a patient's dental X-ray films placed against the illuminated screen of the viewer to provide 1:1 viewing thereof.

DESCRIPTION OF THE PREFERRED EMBODIMENT

Figure 1:
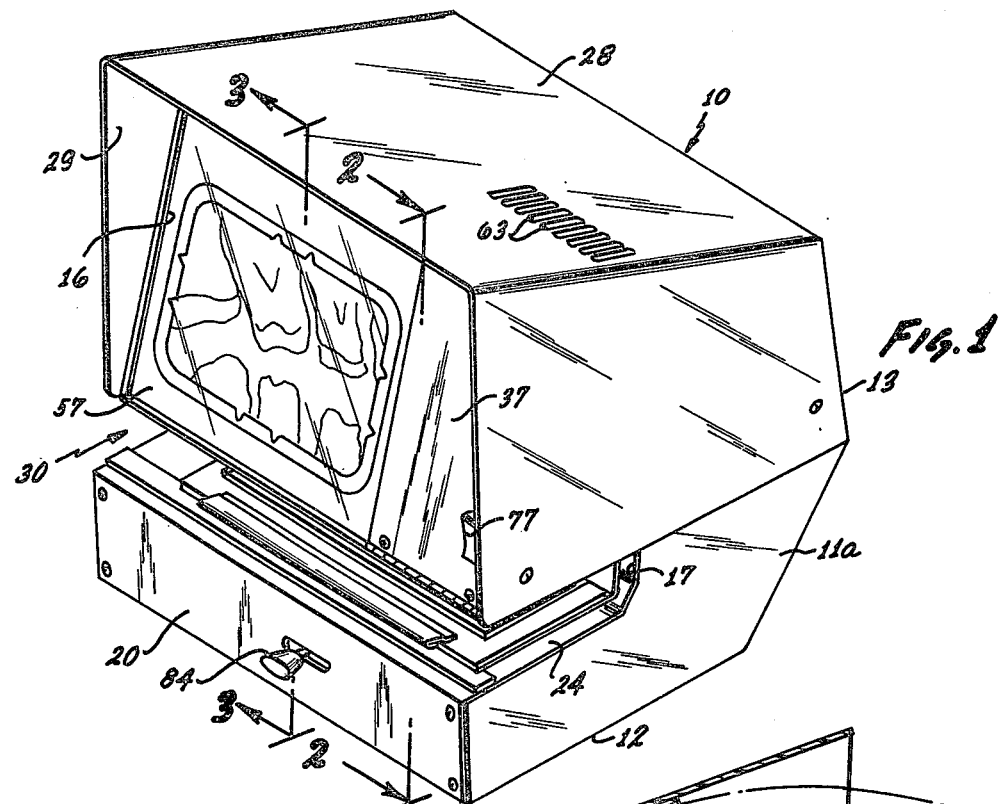
FIG. 1 is an overall perspective view of a dental X-ray film viewer embodying the present invention.

Referring to the drawings, a housing 10 for the dental viewer of the present invention comprises a pair of sidewalls 11a and 11b, a bottom wall 12, and a rear wall 13. Each of the sidewalls 11a and 11b is formed with an elongated horizontal slot 17 which extends inwardly from the front thereof slightly less than half the depth of the housing. A generally U shaped member 24 having a channel cross section conforming to the shape of the slots 17 is positioned between the sidewalls 11a to 11b with its ends attached to the inner surfaces of the sidewalls. The U shaped member 24 thus forms a throat 30 on the front of the viewer housing 10 which effectively vertically divides the housing into an upper section 14 and a lower section 15. A front panel 20 is removably attached to the front of the lower section of the housing.

Referring to FIG. 2a, spaced from the sidewall 11a on the front of the upper section of the housing 10 is a side partition 26 which together with a rear partition 36, and a front door 37 form a light compartment 33 whose bottom is a portion of the upper wall of the U shaped member 24.

Figure 2:
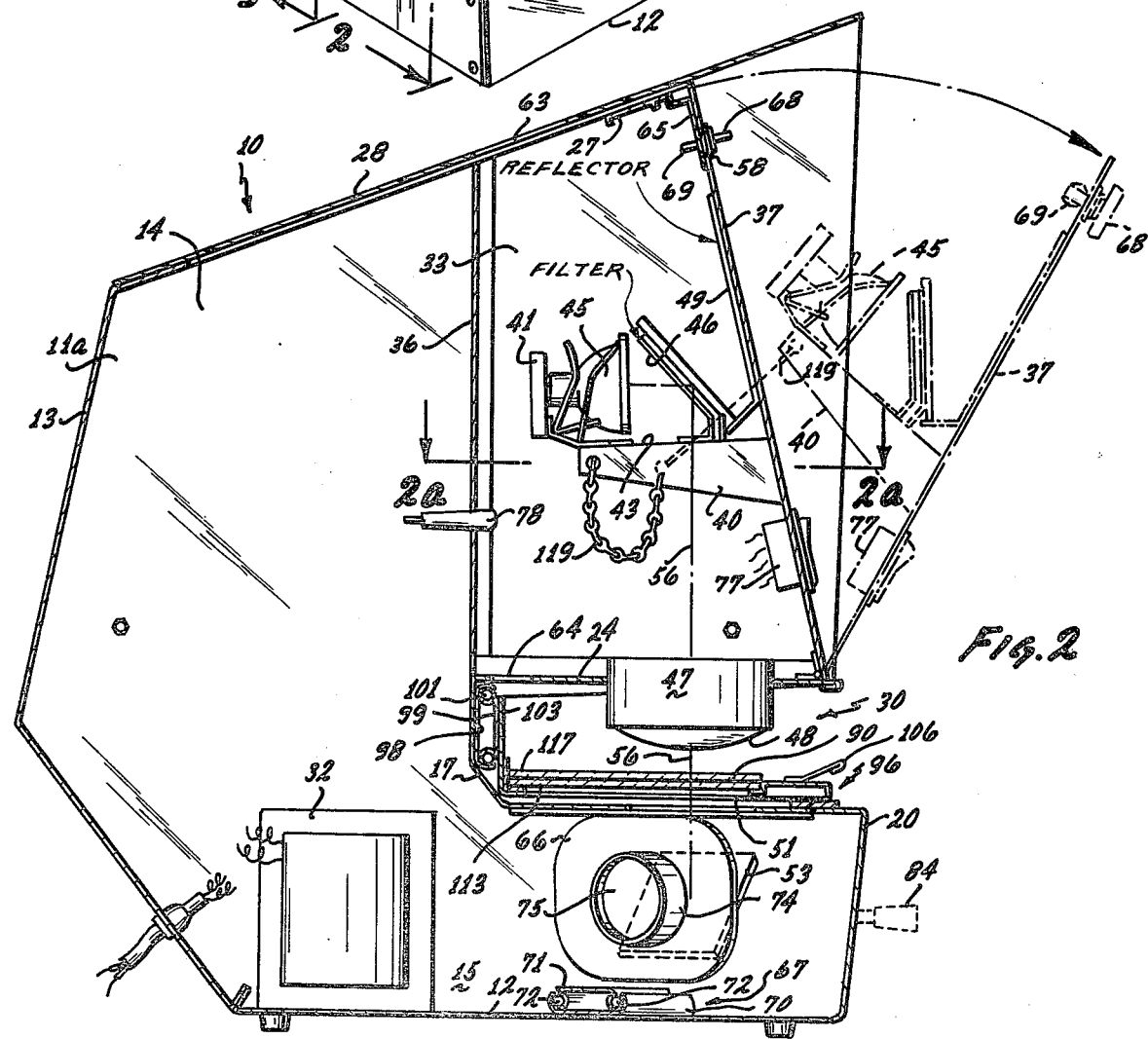
FIG. 2 is a sectional elevational view of the viewer as taken in the direction of arrows 2—2 in FIG. 1.
Figure 3:
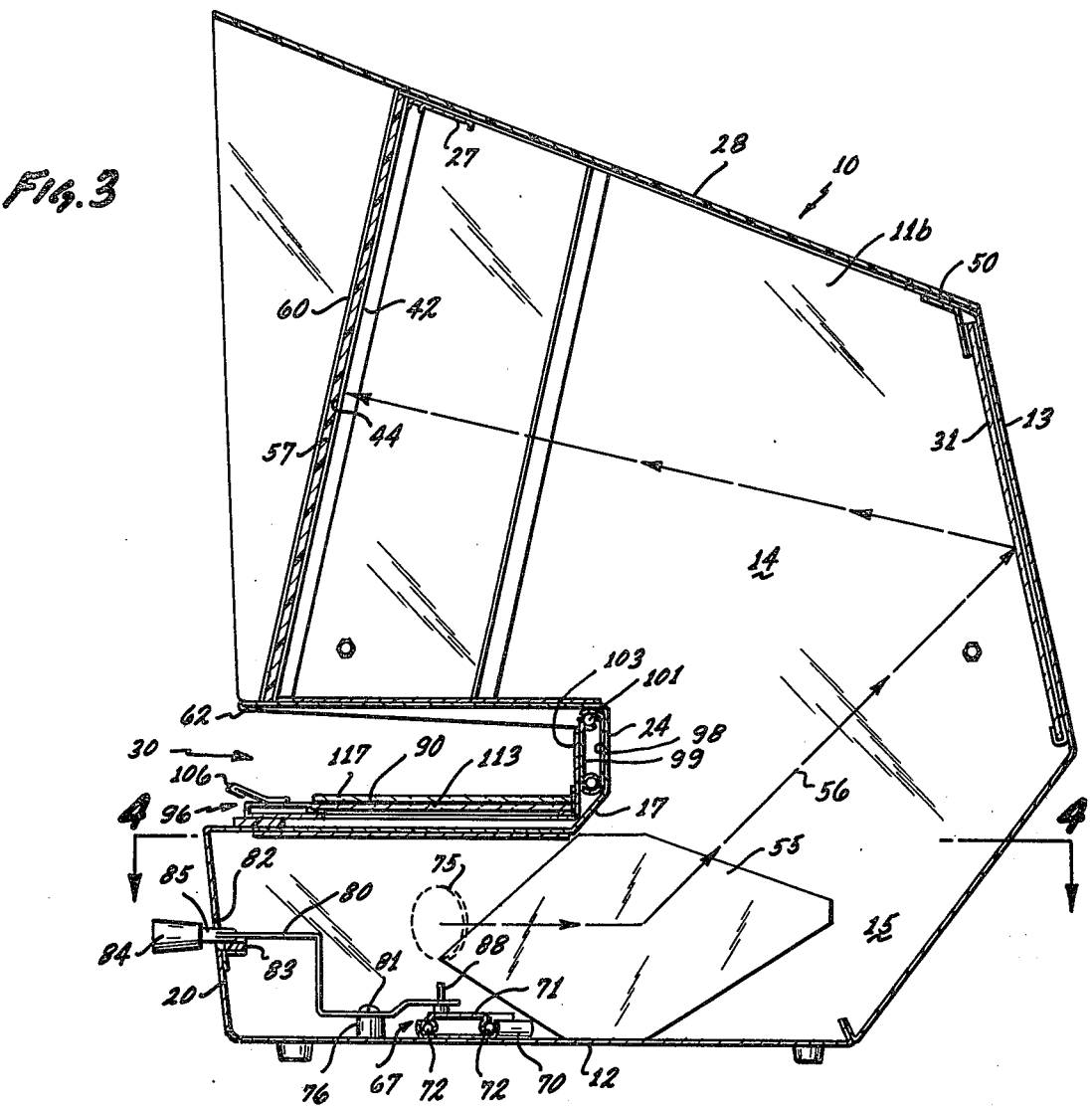
FIG. 3 is a sectional elevational view of the viewer as taken in the direction of arrows 3—3 in FIG. 1.
Figure 9:
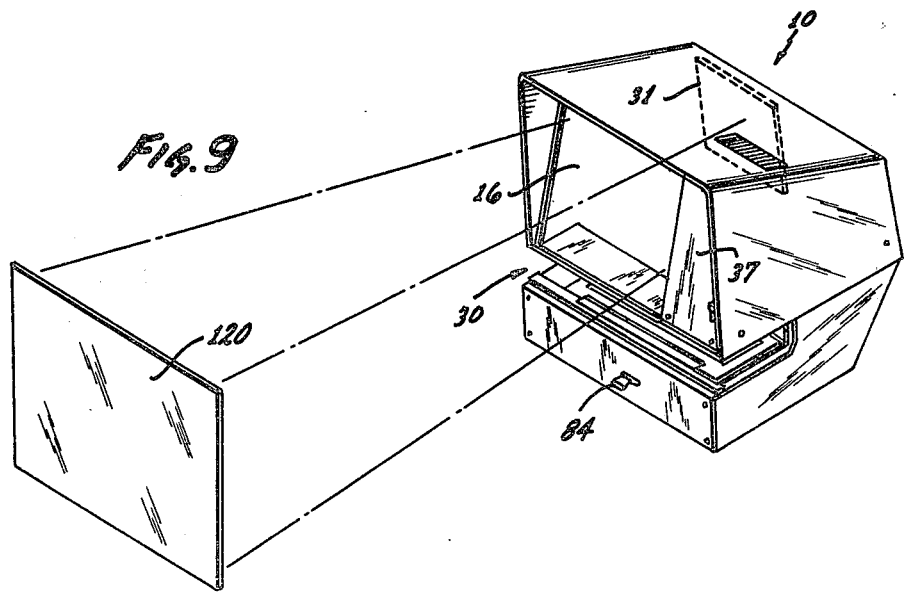
FIG. 9 illustrates the dental viewer with its screen removed such that it serves as a projector for enlarged imaging of an X-ray film on an external screen.

As shown in FIGS. 2a and 3, the front inner side of sidewall 11b has secured thereon an L shaped member 42 whose back is spaced from a front edge projection 60 on the sidewall to form a slot 44. The opposing front inner side of partition 26 has secured thereon an L shaped member 52. The slot 44 and member 52 together with a horizontal member 27 connecting the top front edges of the sidewalls 11a and 11b and a ledge 62 formed by the front upper edge of the U shaped member 24 form a square opening 16 on the front of the upper section of the housing adjacent the light compartment 33. The square opening 16 is covered by a rear illuminated display screen 57 which is positioned to rest on the ledge 62 with its outer side edge fitted in the slot 44 and with its inner side edge resting against the L shaped member 52.

The door 37 of the light compartment 33, which lies in the plane of the display screen 57, has its bottom hinged by a piano hinge 38 to the top outer edge of the U shaped member 24. The door 37 is provided with side flanges 39 (FIG. 2a) which fit over the side front edges of the light compartment and serve to seat the door 37 when it is swung closed. As noted in FIG. 2a, the side flange 39 adjacent square opening 16 further serves to hold the edge of the display screen 57 against the stop formed by the L shaped member 52 when the door 37 is latched closed. As shown in FIG. 2, located across the upper portion of the front opening for the light compartment 33 is a plate 65 provided with a vertical slot 58. A latch 68 is provided with a vertical inner key member 69 which fits in the vertical slot 58 when the door 37 is closed and serves to hold the door closed when the latch 68 is rotated 90 degrees.

The top of the housing 10 is open except for the horizontal member 27 which extends between the upper front edges of the sidewalls 11a and 11b. This member 27 together with an inwardly bent marginal projection 50 on the rear wall 13 (FIG. 3) define the plane of the top of the housing. A cover 28 molded of plastic fits over the top of the housing 10 and extends down over the upper portions of the sidewalls 11a and 11b to just below the top of the U shaped member 24. The upper front wall of the cover 28 extends beyond the member 27 to form a hood 29 for the display screen 57.

It should be particularly noted that the outer walls of the housing 10 are shaped to accomodate the positioning therein of the components of the optical projection system without wasting space. Thus, it is necessary for the rear mirror 31 to be held in the proper tilted position to receive light rays from a mirror 55 located in the lower section of the housing and to reflect these rays onto the back of the display screen 57 which is tilted back from the bottom thereof for ease in viewing when the housing is placed on a table for use. Accordingly, the front of the upper section 14 of the housing is rearwardly inclined from the bottom to the top thereof to conform with the position of screen 57, and the rear wall 13 of the upper section is rearwardly inclined from the top to the bottom thereof to conform with the positioning of the rear mirror 31, and the top of the housing is upwardly inclined from the rear to the front thereof to accomodate the expanding light path to the display screen 57.

Attached to the back of the door 37 of the light compartment 33 is a bracket 40 whose top surface 43 is horizontally disposed when the door is seated in its closed position. Mounted on the outer end of the bracket 40 is a ceramic socket 41 for the base of a high intensity quartz halogen lamp 45. Mounted toward the door end of the bracket 40 is a dichroic mirror 46 which is disposed at 45 degrees to the top surface of the bracket. To the rear of the dichroic mirror 46 on the back of the door 37 is an aluminum reflector 49. Located on the lower end of the door 37 is a three position electrical switch 77 for controlling the illumination of lamp 45. As illustrated in FIG. 6, in the switch 77 the first switch position is "off", the second switch position is "low" brightness, and the third switch position is "high" brightness, in that order. The switch 77 provides for changing the illumination of the lamp 45 by switching connections to the windings of a transformer 32 located in the rear of the lower section of the housing.

The transformer 32 receives power through a plug 54 which connects to an A.C. source. A fuse 78 for the electrical circuit can be located on the back partition 36 of the light compartment 33 for easy access.

Mounted on an opening on the bottom of the light compartment 33, which is a portion of the upper wall of the U shaped member 24, is a frame 47 enclosing a condensing lens 48. Just below the condensing lens frame 47 is a rectangular opening 51 (FIG. 2) on the lower wall of the U shaped member 24. It should now be clear that when the door 37 is closed, the visible rays of lamp 45 are reflected vertically downwardly from the dichroic mirror 46 through the condensing lens 48.

A chain 119 has one end connected to the side platform 40 on the back of the door 37 and the other end connected within the light compartment 33 to the inner surface of side partition 26. Thus, when the door is opened its outward movement is limited by the chain.

An X-Y carrier 96 located in the throat 30 of the viewer provides for orthogonally moving an X-ray film holder 90 supported thereon over the rectangular opening 51 so as to position any of the X-ray films 93 mounted in the holder in the light path 56 provided by the condensing lens 48. On the bottom wall 12 of the housing 10, a mirror 53 is supported just below the rectangular opening 51. The mirror 53 is mounted at a 45 degree angle and positioned such that it reflects the vertical light beam it receives along a horizontal light path toward the center of the other side of the lower section 15 of the housing 10. In line with the light path from the mirror 53 is a polygonal mirror 55, which is disposed with a tilt in both the horizontal and vertical planes so as to reflect the light it receives upwardly and rearwardly onto the rear mirror 31 attached on the upper rear wall 18 of the upper section 14 of the housing. The polygonal mirror 55 is shaped to be able to properly reflect the image bearing beam which it receives while still fitting within the confines of the lower section 15 of the housing.

As noted in FIG. 4, the polygonal mirror 55 is positioned so that the rays of the image bearing beam reflected rearwardly and upwardly therefrom onto the rear mirror 31 lie in vertical planes normal to the mirror 31 and are reflected therefrom forwardly and upwardly in the same vertical planes onto the rear of the display screen 57 held on the square opening 16 on the front of the upper section 14 of the housing.

Located along the bottom wall 12 of the housing in alignment with the horizontal light path from the 45 degree mirror 53 to the polygonal mirror 55 is an oblique track 67 comprised of a lower member 70 attached to the bottom of the housing and an upper movable member 71. The opposing sides of these members 70 and 71 are cupped in complementary fashion to form cages for steel balls 72 by which the member 71 moves relative to the member 70. A spacer (not shown) may be attached to the movable member 71 to maintain the steel balls 72 in spaced relation. Note that the insertion of the steel balls in the oppositely cupped sides of the members 70 and 71 serve to key these members together.

Attached near the front end of the movable member 71 is a cylindrical frame 74 for a projection lens 75. The frame 74 is provided with a radially extending light shield 66. Pivotally mounted on a post 76 fixed to the bottom wall 22 of the housing is a lever 80. The central portion of the lever has an opening through which a screw 81 is inserted and engaged in an opening on the top of the post 76. The outer end of the lever 80 which has an upward vertical step extends through a slot 82 provided on the front panel 20 of the housing 10. The bottom of the lever 80 is supported for sliding engagement on a rest 83 inside the panel 20 below the slot 82. A knob 84 located on the outside of the panel 20 has a stem 85 which extends through the slot 82 and is attached to the outer end of the lever 80. The inner pivoted portion of the lever 80 is angularly disposed normal to the track 67. A slot 87 formed on the inner end of the lever 80 engages a pin 88 attached on the upper surface of the movable member 71. Thus, by laterally moving the knob 84 in the front of the viewer, the projection lens cylindrical frame 74 can be moved along the track 67 to focus the image bearing beam via mirrors 55 and 31 onto the display screen 57.

The X-Y carrier 96 which is mounted within the throat 30 of the housing 10 is shown in detail in FIG. 5. The mount for the X-Y carrier 96 includes a vertically disposed stationary member 98 which is secured to the vertical rear wall of the U shaped member 24. The upper and lower sides of member 98 are outwardly cupped. A vertically disposed member 99 having upper and lower sides which are inwardly cupped to complement the side edges of the stationary member 98 is mounted to slide on steel balls 101 caged between the upper and lower cupped sides of the stationary and sliding members. A spacer 104 formed of a thin plastic strip is attached to each of the sides of the movable member 99. The steel balls 101 reside in spaced holes provided on the spacer. The steel balls 101 further serve to lock these members together. A longitudinally movable horizontally disposed plate 102 has a vertical back wall 103 which is attached to the sliding member 99. The longitudinal movable plate 102 has an elongated rectangular opening 105 (FIG. 5) which extends through the length thereof and is aligned with the rectangular opening 51 on the lower right side of the U shaped member 24. The extent of the longitudinal movement of the plate 102 to the left is limited by a stop 107 on the sliding member 99 which engages the right end of the stationary member 98. The extent of the movement of the plate 102 to the right is limited by the end of the spacer 73 for the steel balls 101 contacting a stop (not shown) in approximately the middle of the stationary member 98.

Mounted on the longitudinally movable plate 102 is a laterally movable horizontally disposed frame 109. This frame 109 has guideways 108 formed beneath the sides thereof which engage plastic strips 111 attached on the sides of the longitudinal movable plate 102. The strips 111 are made of a plastic material such as an acetal resin having a self lubricating property. The inner edges of all four sides of the opening of the laterally movable frame 109 are inwardly recessed to support a bottom glass plate 113 to the level of the frame 109.

A shoulder 115 formed on the rear of the laterally movable frame 109 provides for positioning a top glass plate 117 over a holder 90 of X-ray films positioned on the bottom glass plate 113. A handle 106 for the X-Y carrier 96 in the form of an elongated projection is attached to the front of the laterally movable frame 109.

The holder 90 for X-ray films is shown in FIG. 7. This holder 90 which may be made of a thin translucent plastic material is formed with a plurality of columns of rectangular openings 91. Each of the openings 91 is provided with recessed edges and tabs 92 on the four sides thereof for holding a dental X-ray film 93 therein.

The right and left openings 91 of the holder 90 when viewed from the face thereof provide for the mounting of X-ray films 93 taken of the teeth located in different areas of the respective right and left sides of the mouth. It should thus be understood that when a dentist views the X-ray films 93 mounted on the holder 90 he can readily relate the locations of the X-ray films 93 to the location of the teeth in the mouth of the patient he is working on. As previously described, the throat 30 of the housing 10 has a rectangular opening 51 on the bottom side thereof in line with the light beam 56 being reflected down from the condensing lens 48. The X-Y carrier 96 enables any of the X-ray films 93 on the holder 90 to be positioned above the rectangular opening 51 in the path of the light beam 56.

The quartz halogen lamp 45 directs the light beam against the dichroic mirror 46 which filters, i.e., passes the infrared rays that are then reflected off the reflector 49 on the back of the door 37 so as to not heat the door. These infrared rays thus remain in the light compartment 32 and tend to heat the air therein. It should now be clear that an advantage of placing the light source for the viewer in an enclosed light compartment 33 which is spaced above the X-ray film 93 to be imaged, is that the heat of the high intensity lamp 45 is isolated from the X-ray film 93 such that a fan need not be provided to cool the viewer in the area of the film. Note that openings 63 and 64 provided on the top and bottom of the light compartment 33 permit cool ambient air to circulate and carry off the heat of the lamp by convection.

The visible rays of the light beam are directed vertically downwardly through the condensing lens 48 in the bottom of the light compartment 33 and projected through the dental X-ray film 93 which is selected to be positioned by the X-Y carrier 96 over the rectangular opening 51 on the bottom wall of the throat 30. Note that the X-ray film 93 is oriented on the X-Y carrier as normally viewed in its holder by the dentist. The light beam with the image is then directed onto the mirror 53 mounted at 45 degrees on the bottom of the housing 10 and reflected therefrom onto the projecting lens 75. By moving the knob 84 of the lever 80 laterally one way or the other, the sliding member 71 carrying the projection lens frame 74 can be moved along the oblique track 67 which extends parallel to the path of the light beam. The image bearing beam upon being focussed by the projection lens 75 is reflected from the polygonal mirror 55 onto the rear mirror 31 which, in turn, reflects the light beam forwardly onto the back of the display screen 57. Thus a focussed enlarged image of the film can be viewed from the front of the display screen 57. The image of the film 93 may be enlarged on the order of 7 to 8 times on the screen 57.

It should now be evident that the beam bearing the image of the X-ray film 93 is rotated such that it is lying horizontally on its side upon reflecting from the 45 degree mirror 53 and is both vertically and laterally inverted upon passing through the projection lens 75. The image bearing beam is then laterally inverted and rotated about its axis into an upright position upon reflecting from the polygonal mirror 55 onto the rear mirror 31 and is again laterally inverted upon reflecting from the rear mirror 31 onto the rear of the display screen 57. It should now be evident that the image of the beam when viewed on the front of the screen 57 has the same lateral and vertical orientation that the film has when viewed in the holder 90 placed on the X-Y carrier 96.

As previously pointed out, the holder 90 provides for holding a set of dental X-ray films taken of the mouth of a patient. When viewed from the face thereof, the holder has openings on the right and left of the center thereof in which X-ray films taken of the right and left areas of the mouth are positioned. Thus, by noting the location of the X-ray film on the holder, the dentist knows which side of the mouth, i.e., the right or left side, the X-ray film corresponds to. It should now be clearly understood that when using the viewer of the present invention, if the dentist moves the X-Y carrier 96 on which the holder 90 is held to the right, he can be sure that the image of the X-ray film he has selected will be moving to the right on the screen 57. Likewise, if he moves the X-Y carrier 96 to the left, he can be sure that the image of the X-ray film he has selected will be moving to the left on the screen 57. Moreover, if he moves the X-Y carrier transversely outwardly, he can be sure that the image of the X-ray film he has selected will be moving downwardly on the screen. Likewise, if he moves the X-Y carrier 96 transversely inwardly, he can be sure that the image of the X-ray film he has selected will be moving upwardly on the screen 57.

It is thus clear that the projection system of the present invention enables a dentist to view the enlarged images of the X-ray films have on the screen in the same upright position that the X-ray films have in the holder 90 and with the same direction of movement given to the X-ray films by the X-Y carrier 96.

As illustrated in FIG. 10, the viewer of the present invention can be converted to operate as a projector by simply opening the door 37 of the light compartment and removing the screen 57. By setting the viewer up in a darkened room, the image of an X-ray film 93 positioned in the path of the condensing lens 48 can then be focussed by use of the knob 84 onto an external screen 120. Such a setup is particularly useful for a large group instruction and study of the X-ray films on a holder.

It should be further noted in FIG. 11 that the viewer can be used for simultaneous viewing without enlargement of all the X-ray films 93 on the holder 90 by placing the holder 90 on the ledge 62 of the square opening provided on the front of the housing for the screen 57 and illuminating the screen by use of the switch 77.

Although the description has been concerned with a particularly illustrative embodiment of the present invention, it is to be understood that many modifications and variations in the construction and arrangement may be provided without departing from the spirit and scope of the invention or sacrificing any of its advantages. The invention is therefore considered as including all such possible modifications and variations coming within the legitimate and valid scope of the appended claims.

What is claimed is:

1. A dental X-ray film viewer comprising:
   a housing having an upper section and a lower section separated by a throat on the front end thereof;
   said upper section having a screen on the front thereof, a rear mirror on the back thereof, and a light compartment on the side of said screen and above said throat;
   said lower section having a first mirror and a second mirror, and a projection lens disposed in the light path between said first and second mirrors;
   a light source in said light compartment including a filter for filtering out the infrared rays of the light provided thereby and including a condensing lens for projecting the visible rays thereof downward through a film supported in said throat to provide an image bearing beam;
   said first mirror receiving the image bearing beam and reflecting it through said projection lens onto the second mirror which in turn reflects it upwardly onto the rear mirror in said upper section from which it is reflected onto the rear of the screen to provide an enlarged image of the film when viewed from the front thereof; and
   wherein said light compartment has a hinged door on the front thereof, and a bracket on the back of said door for supporting components included in said light source.

2. The invention in accordance with claim 1 wherein said display screen is retained in position on the upper section of the housing by a side edge of the door contacting the side of said screen when the door is closed.

3. A dental X-ray film viewer comprising:
   a housing having an upper section and a lower section separated by a throat on the front end thereof;
   said upper section having a screen on the front thereof, a rear mirror on the back thereof, and a light compartment on the side of said screen and above said throat;
   said lower section having a first mirror and a second mirror, and a projection lens disposed in the light path between said first and second mirrors;
   a light source in said light compartment including a filter for filtering out the infrared rays of the light provided thereby and including a condensing lens for projecting the visible rays thereof downward through a film supported in said throat to provide an image bearing beam;
   said first mirror receiving the image bearing beam and reflecting it through said projection lens onto the second mirror which in turn reflects it upwardly onto the rear mirror in said upper section from which it is reflected onto the rear of the screen to provide an enlarged image of the film when viewed from the front thereof; and
   wherein a track is located on the bottom of said lower section in alignment with the light path between said first and second mirrors; means are provided for mounting said projection lens for movement along said track; and a pivotally mounted lever is connected to said mounting means for moving said projection lens along said track, said lever being accessable for lateral movement from the front of the lower section of the housing to focus said image on said screen.

4. A viewer for providing a magnified image of a selected one of a plurality of dental films mounted on a planar holder, said viewer comprising:
   a housing having upper and lower sections separated by a throat extending inwardly from the front thereof;
   a display screen positioned on the front of the upper section;
   a rear mirror disposed opposite the screen on the rear wall of the upper section;
   a light compartment located in the upper section on the side of said screen;
   a light source in said light compartment including a dichroic mirror for transmitting the infrared rays of the light provided thereby and including a condensing lens for projecting the reflected visible rays vertically downwardly through one of the films mounted on the planar holder horizontally lying in the throat between said upper and lower sections to provide an image bearing beam;

a first mirror disposed in said lower section below said film and a second mirror disposed centrally in said lower section forwardly of said rear mirror to thereby provide a horizontal light path which is inclined inwardly from said first mirror to said second mirror;

a projection lens disposed with its optical axis in alignment with said light path between said first and second mirror;

said first mirror disposed to receive the image bearing beam and to reflect it such that it is lying horizontally on its side in alignment with the axis of said projection lens;

said projection lens magnifying the reflected image bearing beam received from said first mirror and inverting it laterally and vertically; and said second mirror disposed to reflect said magnified image bearing beam received from the projection lens rearwardly and upwardly onto said rear mirror to thereby laterally invert and rotate said magnified image bearing beam into an upright position on said rear mirror from which it is reflected forwardly onto the rear of said display screen so that the image produced thereon when viewed from the front thereof has the same orientation as the film in the planar holder horizontally lying in the throat between the upper and lower sections.

5. A viewer for providing an enlarged image of a selected one of a plurality of dental films mounted in a planar holder, said viewer comprising:

a housing having upper and lower sections separated by a throat extending inwardly from the front thereof;

a display screen positioned on the front of the upper section;

a rear mirror disposed within the back of the upper section;

a light compartment located in the upper section on the side of said screen;

a high intensity light source in said light compartment including a filter for filtering out the infrared rays and including a condensing lens for projecting the visible rays downwardly through one of the films mounted on the planar holder horizontally positioned in the throat between said upper and lower sections to provide an image bearing beam;

a first mirror disposed in said lower section below said film and a second mirror disposed centrally in said lower section inwardly of said rear mirror to thereby provide a horizontal light path which is inclined inwardly from said first mirror to said second mirror;

a projection lens disposed with its optical axis in alignment with said path between said first and second mirrors for magnifying the image bearing beam received from said first mirror; and manually controlled means accessable from the front of the lower section of the housing to move said lens along said path for focus adjustment;

said second mirror being so angularly disposed relative to said projection lens and said rear mirror that when said magnified image bearing beam is reflected rearwardly and upwardly off said second mirror onto said rear mirror and then reflected forwardly therefrom an enlarged image of said film is provided on the rear of said screen which when viewed from the front thereof has the same orientation as the film in the planar holder positioned in the throat between said upper and lower sections.

6. A dental X-ray film viewer comprising:

a housing having an upper and lower section separated by a throat on the front end thereof;

said upper section having a screen on the front thereof, a rear mirror on the back thereof, and a light compartment on the side of said screen and above said throat;

said lower section having a first mirror and a second mirror, and a projection lens disposed on the light path between said first and second mirrors;

a light source in said light compartment including a filter for filtering out the infrared rays of the light provided thereby and including a condensing lens for projecting the visible rays thereof downward through a film supported in said throat to provide an image bearing beam;

said first mirror receiving the image bearing beam and reflecting it through said projection lens onto the second mirror which in turn reflects it upwardly onto the rear mirror in said upper section from which it is reflected onto the rear of the screen to provide an enlarged image of the film when viewed from the front thereof; and an X-Y carrier comprised of a longitudinally movable member having a vertical rear wall attached by a ball slide to the rear vertical wall of said throat, and a laterally movable member slideable on plastic strips attached to the ends of said longitudinally movable member, said X-Y carrier providing for positioning the film in a path of the visible rays projected by said condensing lens.

7. The invention in accordance with claim 6 including a holder on which a set of X-ray films taken of different portions of the mouth of a patient are mounted, said films being disposed on the holder in right and left locations thereof corresponding to the right and left locations of the mouth, and said holder being mounted on said X-Y carrier to enable any of the films on the holder to be positioned in the path of the visible rays projected by said condensing lens.

8. The invention in accordance with claim 7 including a ledge on the bottom of said screen on which said holder can be placed for 1:1 viewing of the films thereon when the screen is illuminated.

9. The invention in accordance with clain 6 wherein the projection system provided by said first and second mirrors, said projection lens, and said rear mirror provides for the movement of a selected film by said X-Y carrier to produce an equivalent movement of the enlarged image of said film on said screen.

* * * * *